US005230524A

United States Patent [19]

Jackson

[11] Patent Number: 5,230,524

[45] Date of Patent: Jul. 27, 1993

[54] CARRIER FOR PATIENTS OR THE LIKE

[76] Inventor: Nathaniel G. Jackson, P.O. Box 547, Decatur, Ga. 30031

[21] Appl. No.: 859,114

[22] Filed: Mar. 27, 1992

[51] Int. Cl.[5] ..... B62B 7/04

[52] U.S. Cl. ..... 280/47.38; 180/907; 224/42.32; 224/273; 280/47.4; 280/304.1; 280/304.5; 297/188; 297/423; 297/DIG. 4

[58] Field of Search ..... 280/250.1, 47.38, 47.4, 280/304.1, 304.5; 180/907; 297/DIG. 4, 188, 194, 423; 224/273, 275, 42.32

[56] References Cited

U.S. PATENT DOCUMENTS

| | | | |
|---|---|---|---|
| D. 155,785 | 11/1949 | Davis | 280/47.38 |
| 612,760 | 10/1898 | Wells | 297/423 |
| 2,488,681 | 11/1949 | Sohn | 297/DIG. 4 |
| 2,633,896 | 4/1953 | Thompson | 297/DIG. 4 |
| 3,054,638 | 9/1962 | Johnson et al. | 297/188 |
| 3,139,306 | 6/1964 | Jennings et al. | 297/423 |
| 3,215,469 | 11/1965 | Wamsley | 297/DIG. 4 |
| 3,964,786 | 6/1976 | Mashuda | 297/DIG. 4 |
| 4,054,319 | 10/1977 | Fogg, Jr. et al. | 297/DIG. 4 |
| 4,431,206 | 2/1984 | Pryor | 280/304.1 |
| 5,028,065 | 7/1991 | Danecker | 280/304.1 |

*Primary Examiner*—Eric D. Culbreth
*Attorney, Agent, or Firm*—James B. Middleton

[57] ABSTRACT

A transport vehicle has a seat for a patient of a hospital or the like, and luggage space behind the seat. The vehicle has handles so one person can transport a patient and the patient's luggage at the same time. The vehicle has sockets to receive various support members for IV poles, legs rests and the like for use by patients during transport. The front of the vehicle has a platform for the patient's feet, and the platform has an opening so the patient can stand on the floor while being seated. The vehicle may include a power lift for the seat to assist a patient in standing.

7 Claims, 2 Drawing Sheets

CARRIER FOR PATIENTS OR THE LIKE

FIELD OF THE INVENTION

This invention relates generally to transport vehicles, and is more particularly concerned with a patient transport vehicle having both patient care and storage facilities.

BACKGROUND OF THE INVENTION

Wheelchairs are well known in the art, and have changed but little in the many years of their use. The wheelchair is the primary vehicle for moving non-ambulatory patients in a hospital, nursing home or the like, and for use anywhere by those who have no legs, or who do not have the use of their legs. More recently, it has become common practice for everyone being discharged from a hospital to be transported from the hospital in a wheelchair.

The wheelchair has some disadvantages. One of the primary drawbacks is that the conventional wheelchair has no storage space. Even a person carrying a pocketbook or brief case has no place in a wheelchair to put the item to allow manipulation of the chair. The prior art solution to the problem is to provide a small vehicle, usually motorized, having a basket for receiving small articles. While such vehicles are reasonably popular, and constitute some improvement over the conventional wheelchair, the storage space is s limited that the vehicle is not practical for many purposes. Furthermore, such vehicles are generally constructed for the person who has good use of the body and arms, and are not constructed to care for the very sick or disabled.

When patients in hospitals or the like must be transported with their baggage, the presently conventional method is to place the patient in a wheelchair, and use two or more people to push the wheelchair and to carry the baggage. Alternatively one must make two or more trips to transfer all the baggage. It will of course be understood that skilled people are used to transport patients in order to care for the patient during transport. Use of two or more of these skilled people therefore substantially increases the labor cost in transporting patients, whether transportation from one room to another or transporting for discharge.

SUMMARY OF THE INVENTION

The present invention provides a vehicle having a patient receiving portion and a cargo receiving portion. The patient receiving portion includes seat means for receiving a person, said seat means offering adequate support for a person who is feeble or otherwise handicapped. The cargo receiving portion preferably has an upper level for receiving small items such as handbags or flowers, and a lower level for receiving larger suitcases and the like. The patient receiving portion of the vehicle includes a platform for receiving the feet of the patient being transported, the platform defining an opening to allow the person's feet to reach the floor while the patient is entering or leaving the vehicle. Further, the vehicle may include a plurality of sockets to receive a pole to hold the container for intravenously administered fluids or for other support requirements, and may receive a leg and foot rest when needed. If desired, a lift may be provided to assist the patient in rising from the seat of the vehicle.

The vehicle of the present invention is designed primarily to be pushed by an attendant; however, it is within the concept of the invention to motorize the vehicle and provide steering means for some uses.

BRIEF DESCRIPTION OF THE DRAWINGS

These and other features and advantages of the present invention will become apparent from consideration of the following specification when taken in conjunction with the accompanying drawings in which.

DESCRIPTION OF THE PREFERRED EMBODIMENT

Figure 1:
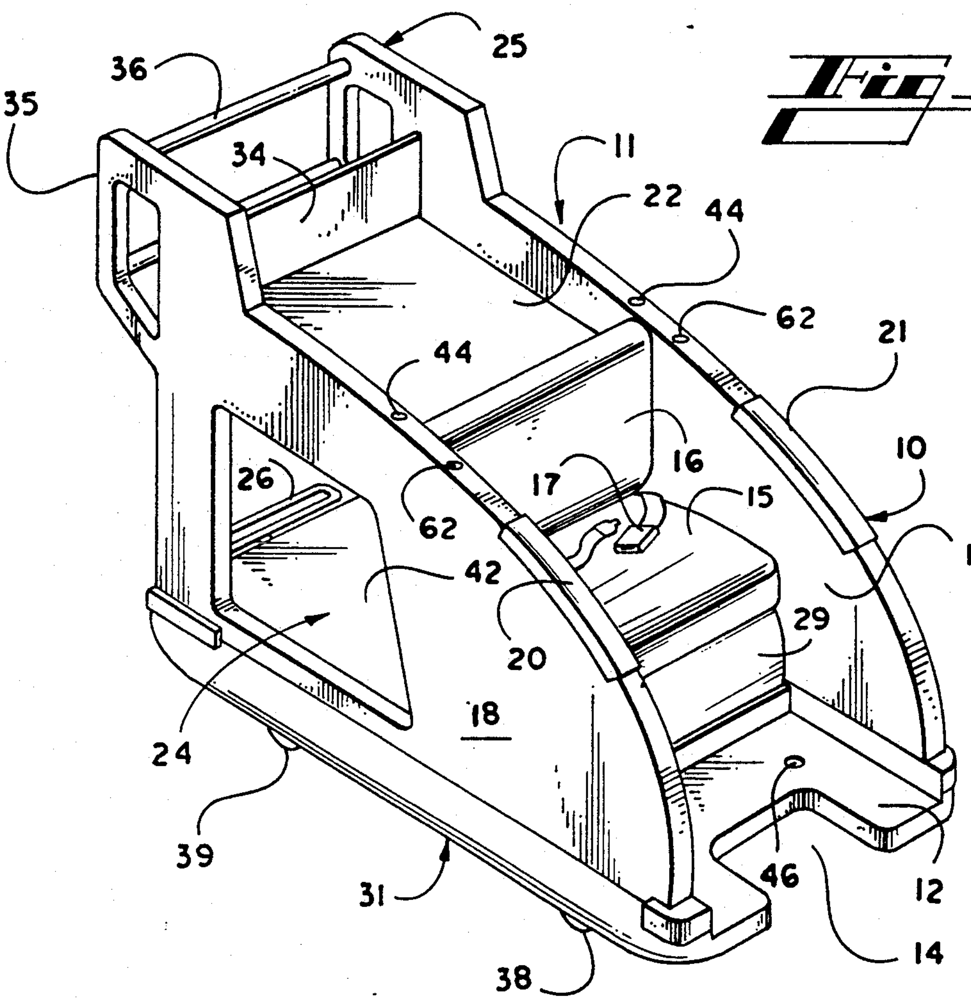
FIG. 1 is a perspective view showing one form of carrier made in accordance with the present invention.

Referring now more particularly to the drawings, and to that embodiment of the invention here presented by way of illustration, FIG. 1 of the drawings shows a carrier comprising a patient receiving portion 10 and a cargo receiving portion 11. The patient receiving portion 10 includes a platform 12 defining an opening 14 generally centrally thereof, and a seat 15 disposed rearwardly of and above the platform 12. At the rear edge of the seat 15 is a back rest 16, and at each side of the patient receiving portion 10 there is a side wall as indicated at 18 and 19. Conventional seat belts 17 may be provided, and handrails 20 and 21 are appropriately carried by the side walls 18 and 19. As here shown, the handrails 20 and 21 comprise coverings over the edges of the side walls 18 and 19. The coverings are preferably made of rubber, or a polymeric elastomer or the like to provide a secure grip for a patient carried in the vehicle. Those skilled in the art will realize that separate handrails may be fixed to the side walls if desired. So long as the side walls are of the proper height and location, however, the edges themselves may serve as handrails, augmented by the non-slip coverings.

The platform 12 can be used as a foot rest for the patient in the vehicle. The opening 14 in the platform allows a patient to stand on the floor while being seated on the seat 15. It will be understood that, without the opening 14, a person would be required to step onto the platform 12, then turn around and be seated. Such an activity may be difficult for an infirm person, and the opening 14 allows the person to remain on the floor and be seated in one's usual fashion. After the person is seated, the feet can be lifted from the floor and rested on the platform 12.

The cargo receiving portion 11 of the vehicle includes an upper area 22 and a lower area 24. The upper area 22 comprises a shelf immediately behind the backrest 16, and is admirably suited to receive small handbags and the like, and is also well adapted to receive flowers, potted plants and the like. Since the upper shelf is open, the shelf may receive flowers and other relatively tall items that may be damaged in closed cargo spaces. The lower area 24 is immediately below the upper area 22, but also extends forwardly thereof as will be seen in more detail later.

Finally, behind the cargo receiving portion 11 of the vehicle there is a handle portion generally designated at 25. The handle portion 25 provides convenient means for a nurse or technician to control the vehicle. The handles will be discussed in more detail hereinafter.

As part of the control means, the vehicle of the present invention includes braking means. A brake pedal 26 is shown in FIG. 1, and the braking means will be discussed further hereinafter.

Figure 2:
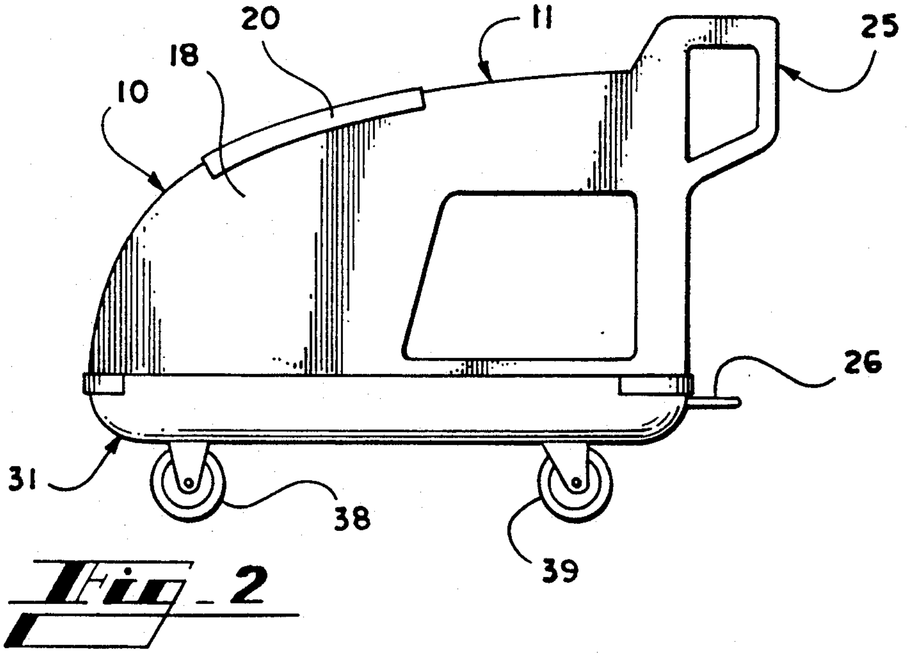
FIG. 2 is a side elevational view showing the carrier illustrated in FIG. 1.
Figure 3:
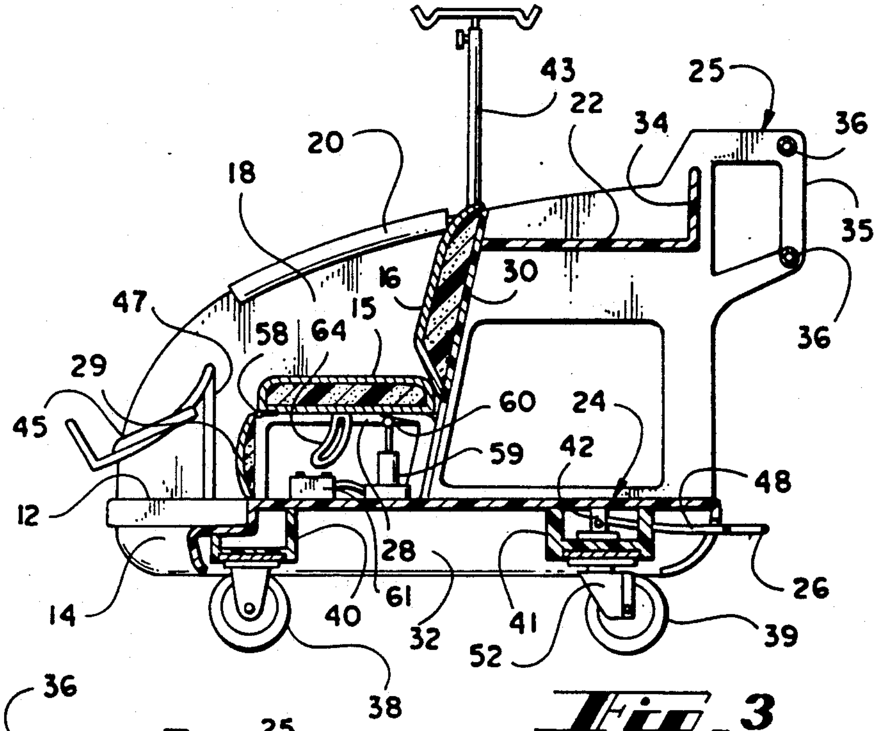
FIG. 3 is a longitudinal cross-sectional view taken through the carrier shown in FIGS. 1 and 2.

Attention is now directed to FIGS. 1, 2 and 3 for an understanding of the construction of the vehicle of the present invention. While the vehicle can be fabricated, molded, or made by some combination of these techniques, it is contemplated that the vehicle will be made by molding the principal parts, and assembling these parts. One embodiment of the invention has been made by molding the side walls and the base members, and assembling these parts using screws, rivets and the like. Other manufacturing techniques are possible, and will produce an equally usable vehicle.

The device shown in the drawings includes the side walls 18 and 19. In the patient receiving portion 10, the side walls 18 and 19 have seat supports 28 molded therewith. It will be understood that each of the side walls 18 and 19 includes supports such as the support 28, and the seat 15 extends between the two to be supported on both ends. A front closure member 29 is also attached to the supports 28.

An intermediate panel 30 extends between the side walls 18 and 19 behind the back rest 16, and carries the back rest 16 thereon. The panel 30 will be fixed to both the side walls 18 and 19 with any appropriate means. The panel 30 may be glued, attached with flanges or the like. To extend the storage area 24, however, it is contemplated that the panel 30 will be cut away below the area of the seat 15.

The side walls 18 and 19 are fixed to a base member generally designated at 31. It will be noticed, especially in FIG. 3, that the base member includes a recessed area forming the forward platform 12; and, the base member forms the floor of the lower cargo receiving area 24. The base member 31 also includes a skirt 32 to conceal the wheel supports and brake housings. Thus, as is well shown in FIG. 3, the cargo receiving portion 11 includes the lower portion 24 having the floor extending under the seat 15, with a taller area under the upper shelf 22. The shelf 22 extends from the intermediate panel 30 to the rear wall 34.

The handle portion 25 of the vehicle includes two vertical grips 35 here shown as formed integrally with the side walls 18 and 19, and two horizontal grips 36 which extend laterally between the vertical grips 35. Thus, there are adequate grips to allow a person to have full control of the vehicle, and to have convenient gripping areas.

The wheels for the vehicle of the present invention are constructed the same as the wheels for the conventional hospital gurney. Those skilled in the art will understand that the gurney wheels include one pair of straight wheels and one pair of casters, and that the casters are provided with selectively engageable brakes. The vehicle of the present invention utilizes the same wheels, the straight wheels 38 being used as the front wheels while the casters 39 are used as the rear wheels.

The front, or patient receiving portion 10, includes a housing 40 carried by the base 31 to achieve the proper wheel mounting level, and the wheels 38 are bolted thereto. A similar housing 41 receives the mounting shank 42 of the caster 39, as well as the brake operating assembly. The brakes will be discussed in more detail below; however, it can be seen in FIG. 3 that the brake pedal 26 has an operating arm that extends into the housing 41 to operate the brakes of the casters 39.

Realizing that the vehicle of the present invention is designed to transport patients of hospitals, clinics and the like, it will be understood that a patient may require intravenous administration of a fluid, or may require a leg rest for broken bones or otherwise unusable legs. Appropriate supports are easily fixed to the vehicle of the present invention.

FIG. 3 illustrates a pole 43 for supporting an IV bottle; and, in FIG. 1 it can be seen that there is a socket 44 on each side of the vehicle to receive a pole such as the pole 43. Similarly, FIG. 3 illustrates a leg rest 45. A generally conventional leg rest 45 will be fixed to a post 47. The post 47 will be received in the socket 46 shown in FIG. 1. Again, there will be a socket 46 on each side of the vehicle.

With the sockets 44 and 46 on the vehicle, it will be readily understood that other support devices ma be utilized. Various traction equipment and the like may equally well be carried by the sockets as needed for the particular patient.

Figure 5:
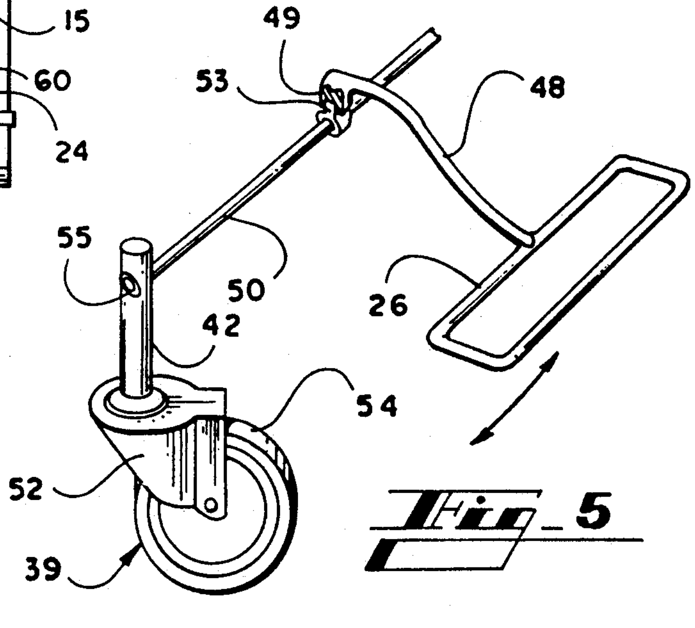
FIG. 5 is a detail showing one form of brake means for use with the present invention.

Attention is directed to FIG. 5 of the drawings for an explanation of the braking mechanism. The brake pedal 26 is shown as carried by a rod 48. The rod 48 terminates in a socket 49 which receives a stub shaft 53 extending from an operating rod 50. A cotter pin or the like will secure the two to form a crank arrangement. The operating rod 50 extends between the two casters 39, only one of which is shown in FIG. 5.

As is stated above, the caster 39 is a conventional gurney caster which is well known in the art. The caster 39 includes a shank 42 extending up from a housing 52, the housing 52 also mounting the wheel 54. The housing 52 includes a brake for the wheel 54, and the brake is operated by rotation of the insert 55. When the insert 55 is rotated in one direction, the brake in the housing 52 locks the wheel 54; and, when the insert 55 is rotated in the opposite direction, the brake is released.

It will therefore be understood that one can depress the pedal 26, and the rod 48 will move down in the slot 56 in the base 31. The pedal 26 and rod 48 actually rotate about the axis of the operating rod 50, causing the operating rod 50 to rotate. The operating rod 50 and the insert 55 are non-cylindrical so that rotation of the rod 50 causes rotation of the insert 55, and this causes the brake to lock the wheel 54. When the brake is to be released, one can raise the pedal 26 using one's toe, and the mechanism will move in the opposite direction to release the brake.

From the foregoing, it will be recognized that the vehicle of the present invention provides a safe, comfortable and convenient vehicle for the transportation of patients, complete with the patient's baggage, medical equipment and other necessities. The patient receiving portion is arranged so that even rather feeble patients can easily be seated in the seat, and appropriate foot rests and the like are provided. Adequate storage space is provided, conveniently located, so everything that is to go with a patient can usually be handled in a single trip, with only one person.

Figure 4:
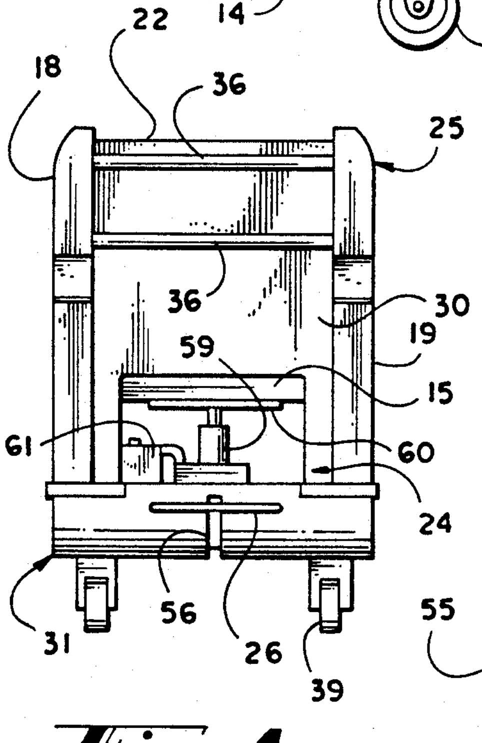
FIG. 4 is a rear elevational view of the carrier shown in FIGS. 1-3;.

As a further assistance for the patient, as well as the attendant, the seat 15 may be liftable to assist the patient in rising from the seat Those skilled in the art will readily devise numerous techniques to lift the seat, but one simple and useful arrangement is shown in FIGS. 3 and 4 of the drawings.

First, it will be noticed that the seat 15 is hinged at 58 so the rear edge of the seat 15 can rise, while the seat 15 pivots at the hinge 58. To lift the seat 15, there is a hydraulic cylinder 59 supported on the base member 31. A T-shaped bar 60 is carried by the cylinder 59 and engages the seat 15. A battery 61 is shown to provide the power for the cylinder 59.

It will be understood that hydraulic cylinders are readily available wherein a motor, a pump, and a cylinder are built together in one unit, so only a power supply is needed. Such a unit is here contemplated, but it is obvious that separate pieces may be assembled as desired. Further, pneumatics may be used, so the power supply would be a tank of compressed gas, or a mechanical mechanism may be electrically operated.

To operate the lift illustrated, pushbuttons 62 are provided on the walls 18 and 19. The buttons 62 are so placed that the patient will not inadvertently press a button, but the buttons are convenient to the attendant. As here shown, the buttons are rearwardly of the backrest 16. When a pushbutton 62 is depressed, the battery 61 will be electrically connected to the hydraulic unit 59, and the cylinder will urge the bar 60 up, lifting the seat 15 with the patient thereon. A limit may be provided as indicated at 64 to limit the movement of the seat 15

While the power lift occupies part of the cargo space, if one must frequently carry patients who require assistance in rising, the power lift will be sufficiently valuable to sacrifice part of the cargo space. Otherwise, the power lift may be omitted to provide the cargo space described above.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. A transport vehicle comprising a patient receiving portion and a cargo receiving portion, and control means for controlling said vehicle, said patient receiving portion including a platform at one end of said vehicle, a seat adjacent to and above said platform, and a back rest substantially contiguous with said seat, said cargo portion being located at the opposite end of said vehicle, said control means including handle means for allowing a person to move and to guide said vehicle, said vehicle including a base having said patient receiving portion and said cargo receiving portion thereon, said base including a pair of wheels at said one end of said vehicle and a pair of casters at said opposite end of said vehicle, said handle means being on said opposite end of said vehicle, and further including a pair of walls disposed at each side of said base, said seat being located between the walls of said pair of walls, and including handrails carried by said pair of walls adjacent to said seat, and wherein said platform defined an opening therein, said opening extending from said one end of said vehicle substantially to said seat, said cargo portion being between said walls and including a lower level substantially co-planar with said platform and an upper level above said lower level, said upper level extending from said back rest to said opposite end of said vehicle, said lower level extending substantially from said opposite end of said vehicle to said platform.

2. A transport vehicle as claimed in claim 1, and further including socket means, at least one support pole, said socket means being disposed adjacent to said back rest and adapted for receiving said support pole.

3. A transport vehicle as claimed in claim 2, said socket means further including second socket means on said platform, and at least one leg rest, said second socket means being adapted to receive said leg rest.

4. A transport vehicle as claimed in claim 1, and further including socket means and at least one support pole, said socket means being within said walls and disposed adjacent to said back rest and adapted for receiving said support pole.

5. A transport vehicle as claimed in claim 4, said socket means further including second socket means on said platform, and at least one leg rest, said second socket means being adapted to receive said leg rest.

6. A transport vehicle as claimed in claim 1, and further including hinge means for said seat, said seat having a front edge and a rear edge, said rear edge being adjacent to said back rest, said hinge means being at said front edge of said seat so that said rear edge can pivot upwardly, and lift means for lifting said rear edge.

7. A transport vehicle as claimed in claim 6, said lift means comprising a fluid operated cylinder, and power supply means for operating said cylinder.

* * * * *